United States Patent
Seo et al.

(10) Patent No.: US 10,567,129 B2
(45) Date of Patent: Feb. 18, 2020

(54) METHOD FOR TRANSMITTING/RECEIVING SIGNALS USING MULTIPLE CARRIERS IN WIRELESS COMMUNICATION SYSTEM AND DEVICE THEREFOR

(71) Applicant: LG ELECTRONICS INC., Seoul (KR)

(72) Inventors: Hanbyul Seo, Seoul (KR); Dongyoun Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/254,396

(22) Filed: Jan. 22, 2019

(65) Prior Publication Data

US 2019/0158234 A1   May 23, 2019

Related U.S. Application Data

(63) Continuation of application No. 14/772,533, filed as application No. PCT/KR2014/001342 on Feb. 19, 2014, now abandoned.

(Continued)

(51) Int. Cl.
*H04L 5/00* (2006.01)
*H04L 5/14* (2006.01)
(Continued)

(52) U.S. Cl.
CPC ............ *H04L 5/001* (2013.01); *H04L 5/0092* (2013.01); *H04L 5/14* (2013.01); *H04L 5/1469* (2013.01);
(Continued)

(58) Field of Classification Search
None
See application file for complete search history.

(56) References Cited

U.S. PATENT DOCUMENTS 9,166,747 B2 * 10/2015 Moon ................... H04L 1/1861
2010/0254329 A1   10/2010 Pan et al.
(Continued)

FOREIGN PATENT DOCUMENTS

KR   10-2011-0022695      3/2011
KR   10-2012-0031217      3/2012
(Continued)

OTHER PUBLICATIONS

U.S. Appl. No. 14/772,533, Final Office Action dated Apr. 20, 2018, 13 pages.

(Continued)

*Primary Examiner* — Mohammad S Adhami
(74) *Attorney, Agent, or Firm* — Lee Hong Degerman Kang & Waimey

(57) ABSTRACT

The present application discloses a method whereby user equipment receives signals from a base station via a first carrier and a second carrier in a wireless communication system. More specifically, the method comprises the steps of: receiving a downlink control channel on the first carrier; and receiving at least one downlink data channel on the first and second carriers on the basis of the downlink control information, wherein the first carrier is for use as a downlink, the second carrier is for use as an uplink or a downlink, and the downlink control channel includes information regarding the use of the second carrier.

14 Claims, 11 Drawing Sheets

Related U.S. Application Data

(60) Provisional application No. 61/774,596, filed on Mar. 8, 2013.

(51) Int. Cl.
  *H04W 72/00* (2009.01)
  *H04W 72/04* (2009.01)
  *H04W 88/02* (2009.01)
  *H04W 88/08* (2009.01)

(52) U.S. Cl.
  CPC ......... *H04W 72/00* (2013.01); *H04W 72/042* (2013.01); *H04W 72/0453* (2013.01); *H04W 88/02* (2013.01); *H04W 88/08* (2013.01)

(56) References Cited

U.S. PATENT DOCUMENTS

| | | | |
|---|---|---|---|
| 2011/0243106 A1* | 10/2011 | Hsu | H04L 5/0096 370/336 |
| 2011/0286397 A1 | 11/2011 | Kim et al. | |
| 2012/0044921 A1* | 2/2012 | Chung | H04J 11/0069 370/338 |
| 2013/0163529 A1 | 6/2013 | Chen et al. | |
| 2013/0163543 A1* | 6/2013 | Freda | H04W 72/0406 370/329 |
| 2013/0208634 A1 | 8/2013 | Ji et al. | |
| 2014/0044085 A1 | 2/2014 | Hong | |
| 2014/0119246 A1 | 5/2014 | Yin et al. | |
| 2014/0211729 A1 | 7/2014 | Darwood et al. | |
| 2015/0296542 A1* | 10/2015 | Heo | H04W 74/0833 370/329 |
| 2016/0020875 A1 | 1/2016 | Seo et al. | |

FOREIGN PATENT DOCUMENTS

| | | | |
|---|---|---|---|
| KR | 10-2012-0048044 | | 5/2012 |
| WO | WO2011090289 | * | 1/2011 |
| WO | 2012/040901 | | 4/2012 |
| WO | 2012/124924 | | 9/2012 |
| WO | 2012150762 | | 11/2012 |

OTHER PUBLICATIONS

U.S. Appl. No. 14/772,533, Office Action dated Oct. 6, 2017, 11 pages.
U.S. Appl. No. 14/772,533, Final Office Action dated May 10, 2017, 10 pages.
U.S. Appl. No. 14/772,533, Office Action dated Oct. 24, 2016, 14 pages.
PCT International Application No. PCT/KR2014/001342, Written Opinion of the International Searching Authority dated Jun. 2, 2014 16 pages.

* cited by examiner

FIG. 2
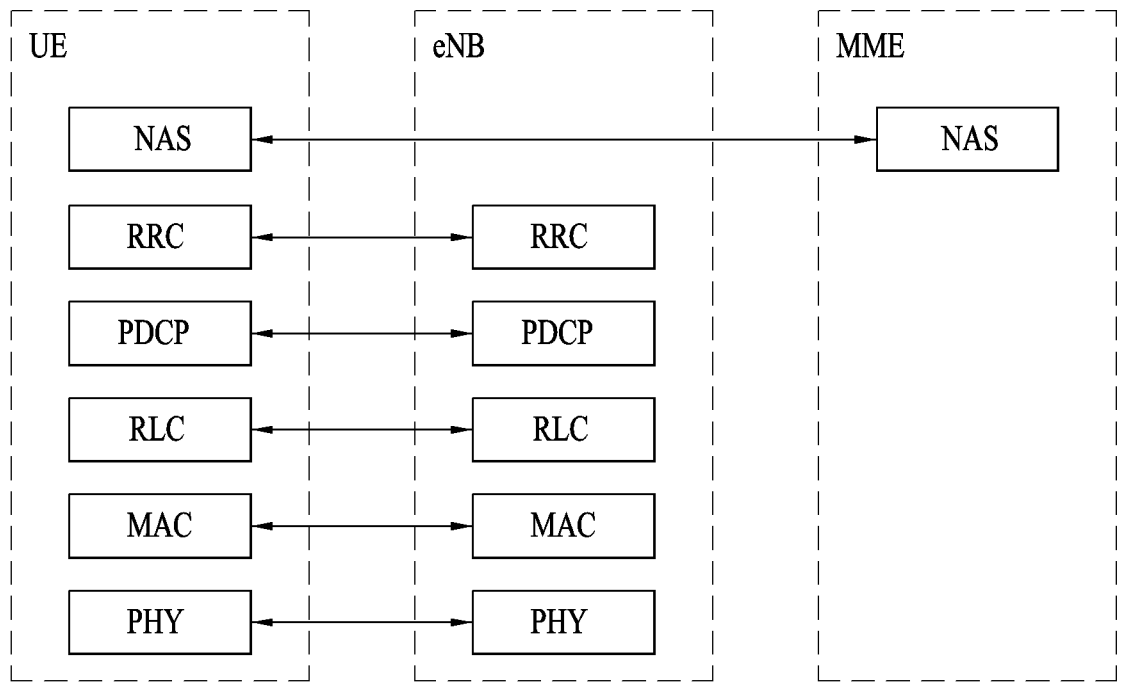
(a) Control - Plane Protocol Stack
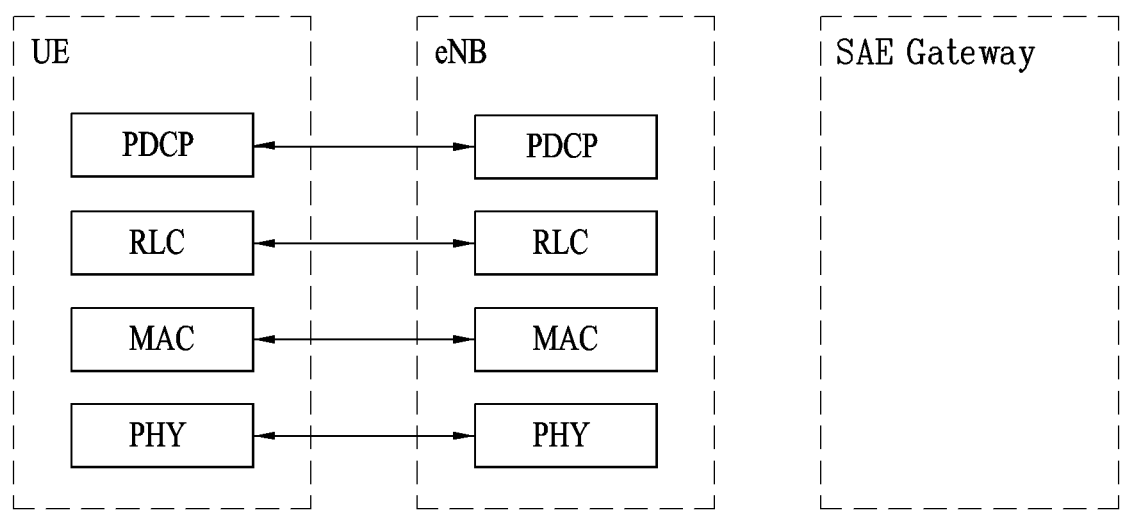
(b) User - Plane Protocol Stack

METHOD FOR TRANSMITTING/RECEIVING SIGNALS USING MULTIPLE CARRIERS IN WIRELESS COMMUNICATION SYSTEM AND DEVICE THEREFOR

CROSS-REFERENCE TO RELATED APPLICATIONS

This application is a continuation of U.S. patent application Ser. No. 14/772,533, filed on Sep. 3, 2015, now abandoned, which is the National Stage filing under 35 U.S.C. 371 of International Application No. PCT/KR2014/001342, filed on Feb. 19, 2014, which claims the benefit of U.S. Provisional Application No. 61/774,596, filed on Mar. 8, 2013, the contents of which are all hereby incorporated by reference herein in their entirety.

TECHNICAL FIELD

The present invention relates to a wireless communication system, and more particularly to a method and apparatus for transmitting and receiving signals using a plurality of carriers in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

An object of the present invention is to provide a method and apparatus for transmitting and receiving signals using a plurality of carriers in a wireless communication system.

Technical Solution

The objects of the present invention can be achieved by providing a method for allowing a user equipment (UE) to receive a signal from a base station (BS) through a first carrier and a second carrier in a wireless communication system including: receiving a downlink control channel on the first carrier; and receiving at least one downlink data channel on the basis of the downlink control channel on the first carrier and the second carrier, wherein the first carrier is a carrier for downlink usage, and the second carrier is a carrier for an uplink or downlink usage, and the downlink control channel includes information regarding usage of the second carrier.

The downlink control channel may include specific information indicating whether the downlink data channel is received on the second carrier.

The downlink control channel may include resource allocation information for one downlink data channel extending over a frequency band of the first carrier and a frequency band of the second carrier. The receiving the at least one downlink data channel may include: receiving the single downlink data channel on the basis of the downlink control channel on the first carrier and the second carrier.

Alternatively, the downlink control channel may include one resource allocation information for the downlink data channel. The receiving the at least one downlink data channel may include: receiving a first downlink data channel using the single resource allocation information on the first carrier; and receiving a second downlink data channel using the single resource allocation information on the second carrier.

The first carrier may be a downlink frequency band of a frequency division duplex (FDD) mode; and the second carrier may be a frequency band of a time division duplex (TDD) mode.

If the second carrier is used for the downlink usage, a frequency band of the downlink usage may be identical in size to a frequency band of the first carrier.

In accordance with another aspect of the present invention, a method for allowing a base station (BS) to transmit a signal to a user equipment (UE) through a first carrier and a second carrier in a wireless communication system includes: transmitting a downlink control channel on the first carrier; and transmitting at least one downlink data channel on the basis of the downlink control channel on the first carrier and the second carrier, wherein the first carrier is a carrier for downlink usage, and the second carrier is a carrier for an uplink or downlink usage, and the downlink control channel includes information regarding usage of the second carrier.

Advantageous Effects

According to exemplary embodiments of the present invention, a user equipment (UE) and a base station (BS) for use in a wireless communication system can efficiently transmit and receive signals using a plurality of carriers.

The effects of the present invention are not limited to the above-described effects and other effects which are not described herein will become apparent to those skilled in the art from the following description.

DESCRIPTION OF DRAWINGS

FIG. 2 illustrates a control-plane protocol stack and a user-plane protocol stack in a radio interface protocol architecture conforming to a 3GPP radio access network standard between a UE and an E-UTRAN.

BEST MODE

Figure 1:
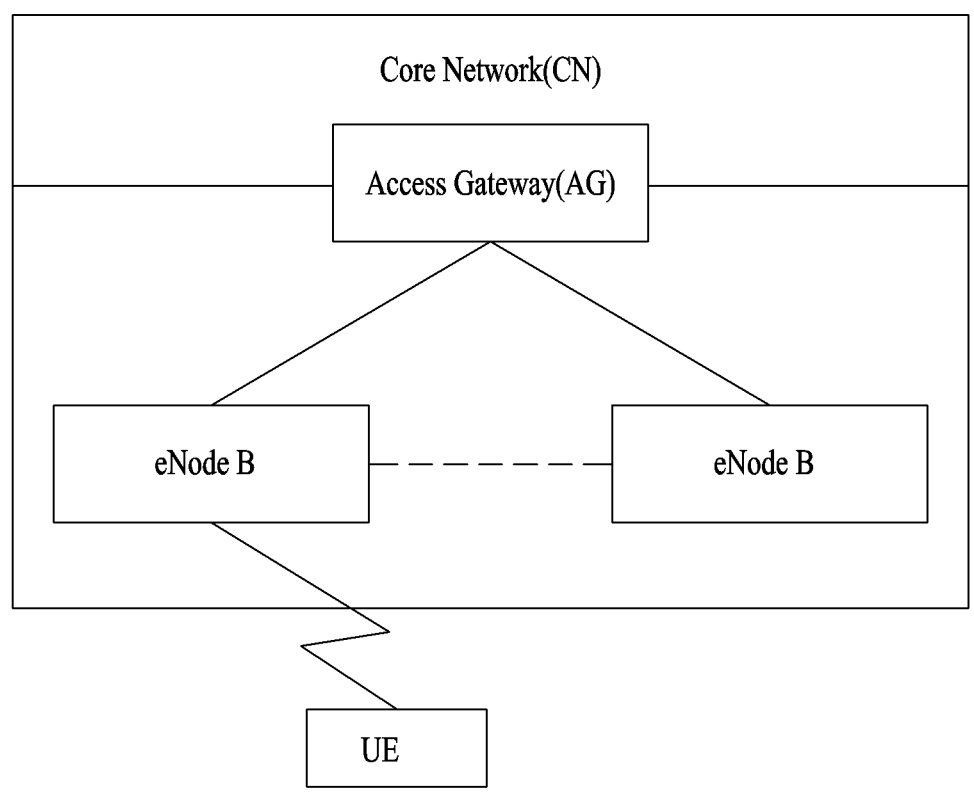
FIG. 1 illustrates a configuration of an E-UMTS network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message.

Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
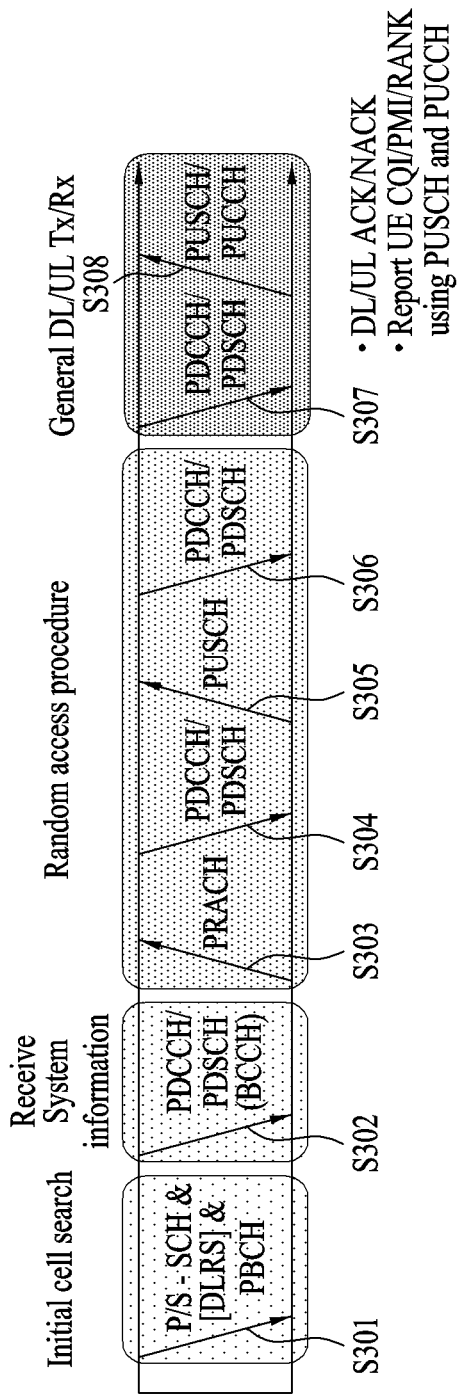
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
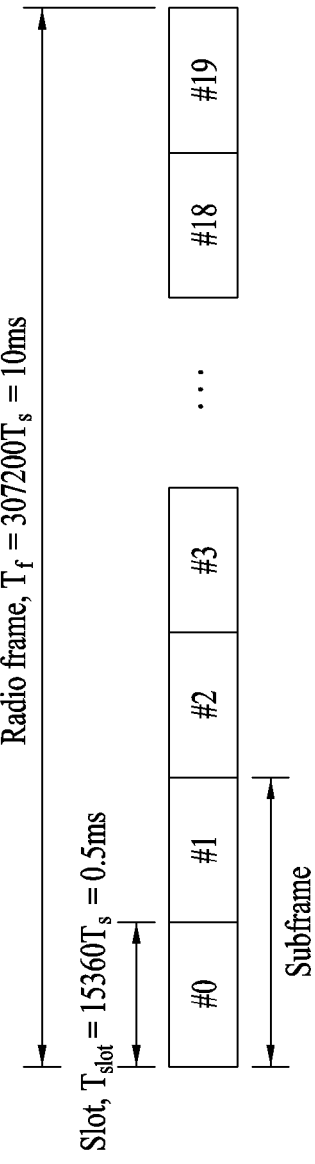
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). Ts denotes a sampling time, and is represented by $T_s=1/(15 \text{ kHz} \times 2048)=3.2552 \times 10-8$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A transmission time interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
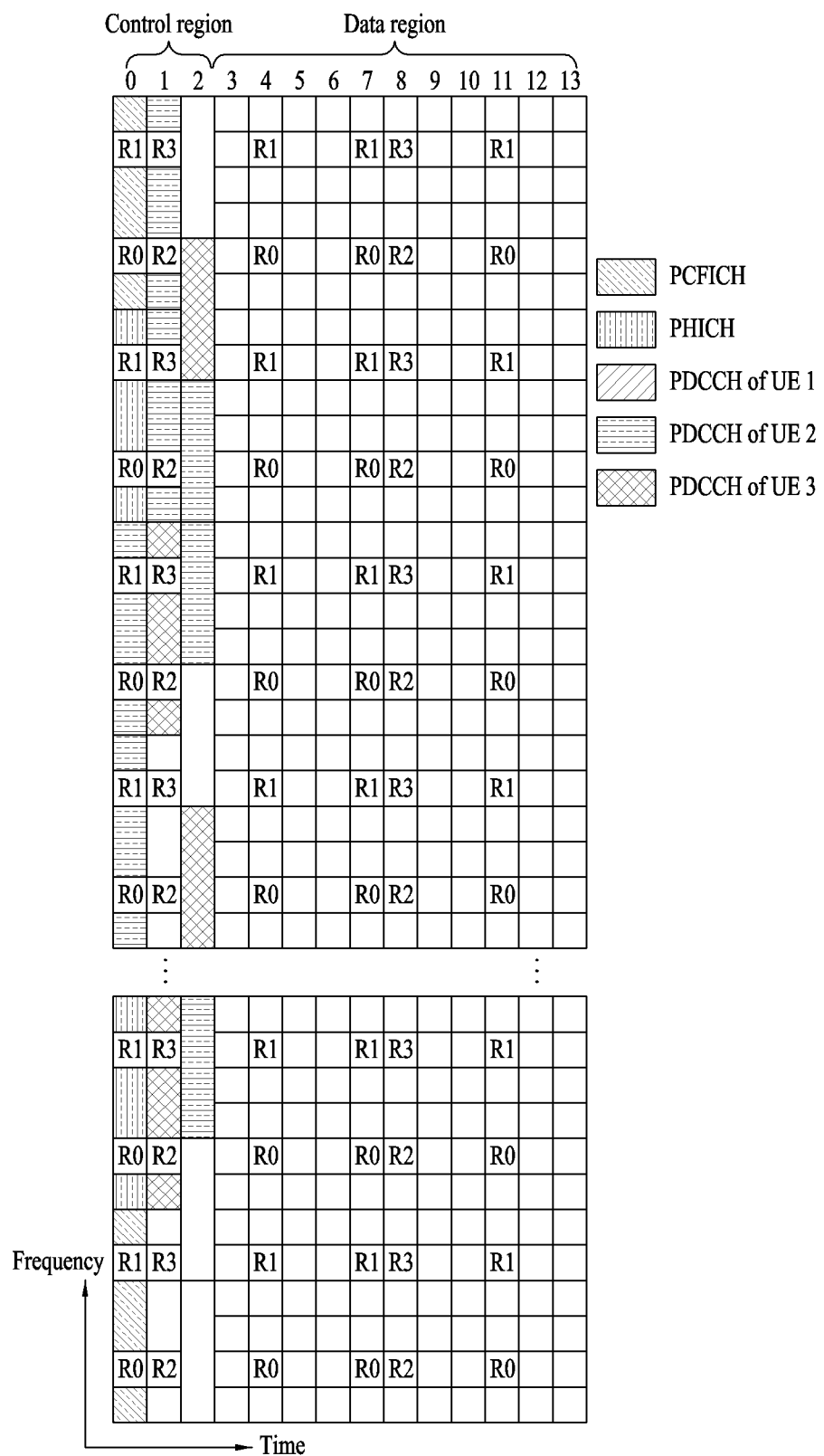
FIG. 5 illustrates a structure of a downlink (DL) subframe in an LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPS K). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A"

and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

The UE is set to confirm $M^{(L)}$ ($\geq L$) CCEs which are arranged consecutively or according to a specific rule in order to determine whether a PDCCH composed of L CCEs is transmitted to the UE. The value L considered when the UE receives the PDCCH may be plural. A set of CCEs which should be confirmed when the UE receives the PDCCH is referred to as a PDCCH search space. For example, in the LTE system, the PDCCH search space is defined as shown in Table 1.

TABLE 1

| Search space $S_k^{(L)}$ | | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is referred to as PDCCH search space hashing.

In the meantime, introduction of a new control channel is being requested to use the MIMO scheme and inter-cell coordinated communication scheme. Due to the above necessity, introduction of a new control channel is an Enhanced PDCCH (EPDCCH) is being intensively discussed, and the new control channel can be allocated to a data region (hereinafter referred to as a PDSCH region) instead of the legacy control region (hereinafter referred to as a PDCCH region). As a result, node control information can be transmitted per UE through EPDCCH, such that the problem of insufficiency of the legacy PDCCH region can also be solved. For reference, EPDCCH is not applied to the legacy UE, and can be received by the LTE-A UE only. In addition, EPDCCH transmission and reception is achieved on the basis of DM-RS (or CSI-RS) instead of a legacy cell-specific RS (CRS).

Figure 6:
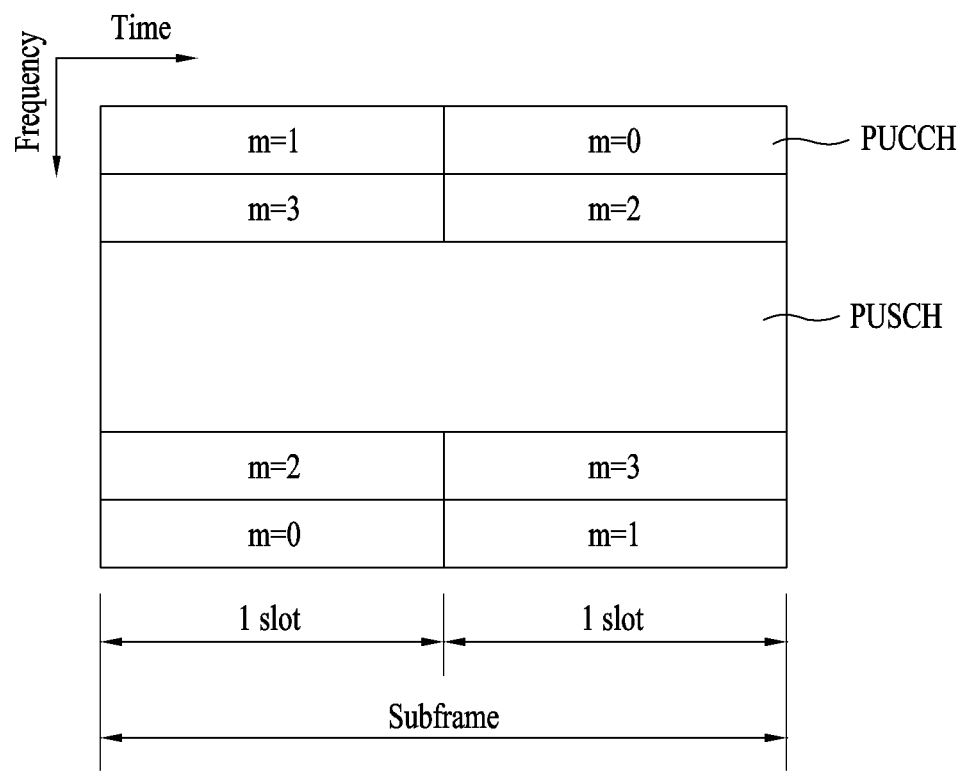
FIG. 6 illustrates a structure of an uplink (UL) subframe in an LTE system.

FIG. 6 illustrates a structure of a UL subframe in the LTE system.

Referring to FIG. 6, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 6.

Figure 7:
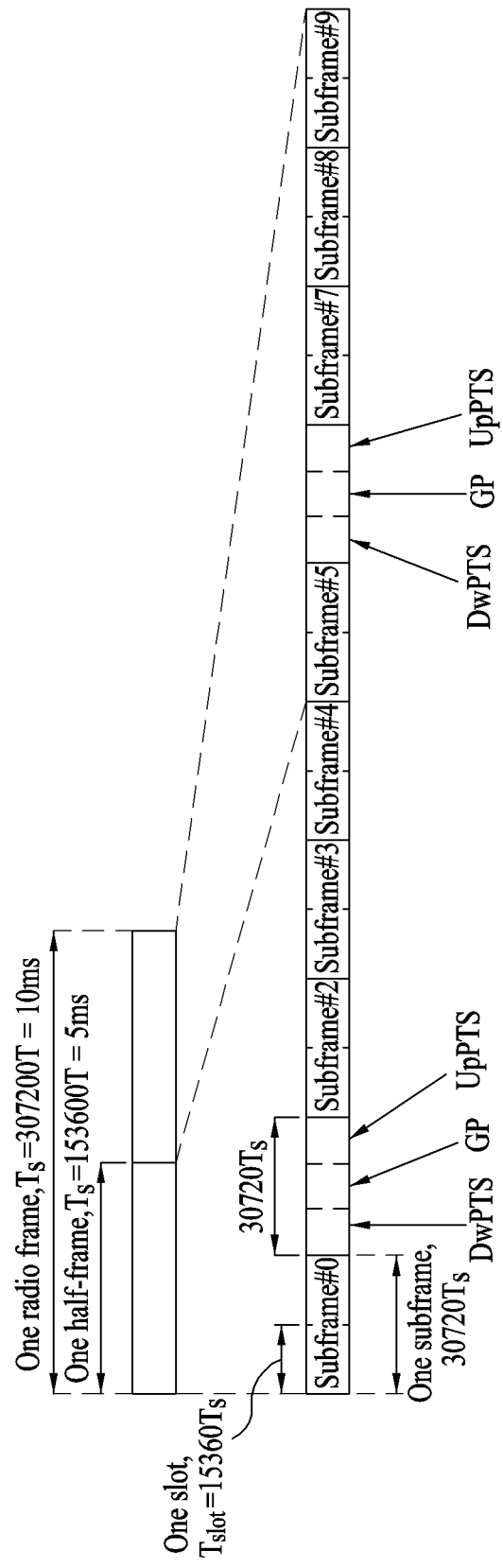
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Special subframe configuration is defined in the current 3GPP standard document as shown in [Table 2] below. In [Table 2], $T_s=1/(15000\times2048)$ refers to a DwPTS and a UpPTS and the remaining region is configured as a GP.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |

TABLE 2-continued

| | | Normal cyclic prefix in downlink | | Extended cyclic prefix in downlink | | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, in an LTE TDD system, a UL/DL configuration is shown in Table 3 below.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 3, D indicates a downlink subframe, U indicates an uplink subframe, and S means the special subframe. Also, the above Table 3 represents a downlink-uplink switching period of uplink/downlink subframe configuration in each system.

A transmission mode of a downlink data channel will hereinafter be described in detail. 3GPP LTE standard, e.g., 3GPP TS 36.213 document has defined the downlink data channel transmission mode as shown in the following Table 4. The following transmission mode is established in a user equipment (UE) through higher layer signaling (i.e., RRC signaling).

TABLE 4

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |

TABLE 4-continued

| Transmission mode | DCI format | Transmission scheme of PDSCH corresponding to PDCCH |
|---|---|---|
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

Referring to Table 4, 3GPP LTE standard has disclosed transmission modes and DCI modes corresponding to the transmission modes, i.e., DCI formats based on transmission modes. In addition, DCI format 1A for a fall-back mode, irrespective of individual transmission modes, has been defined in 3GPP LTE standard. As an example of the transmission modes, if DCI format 1B is detected when a UE performs blind decoding (BD) of PDCCH in Table 1, it is assumed that PDSCH is transmitted according to the closed-loop spatial multiplexing scheme based on a single layer, PDSCH decoding is carried out.

Figure 8:
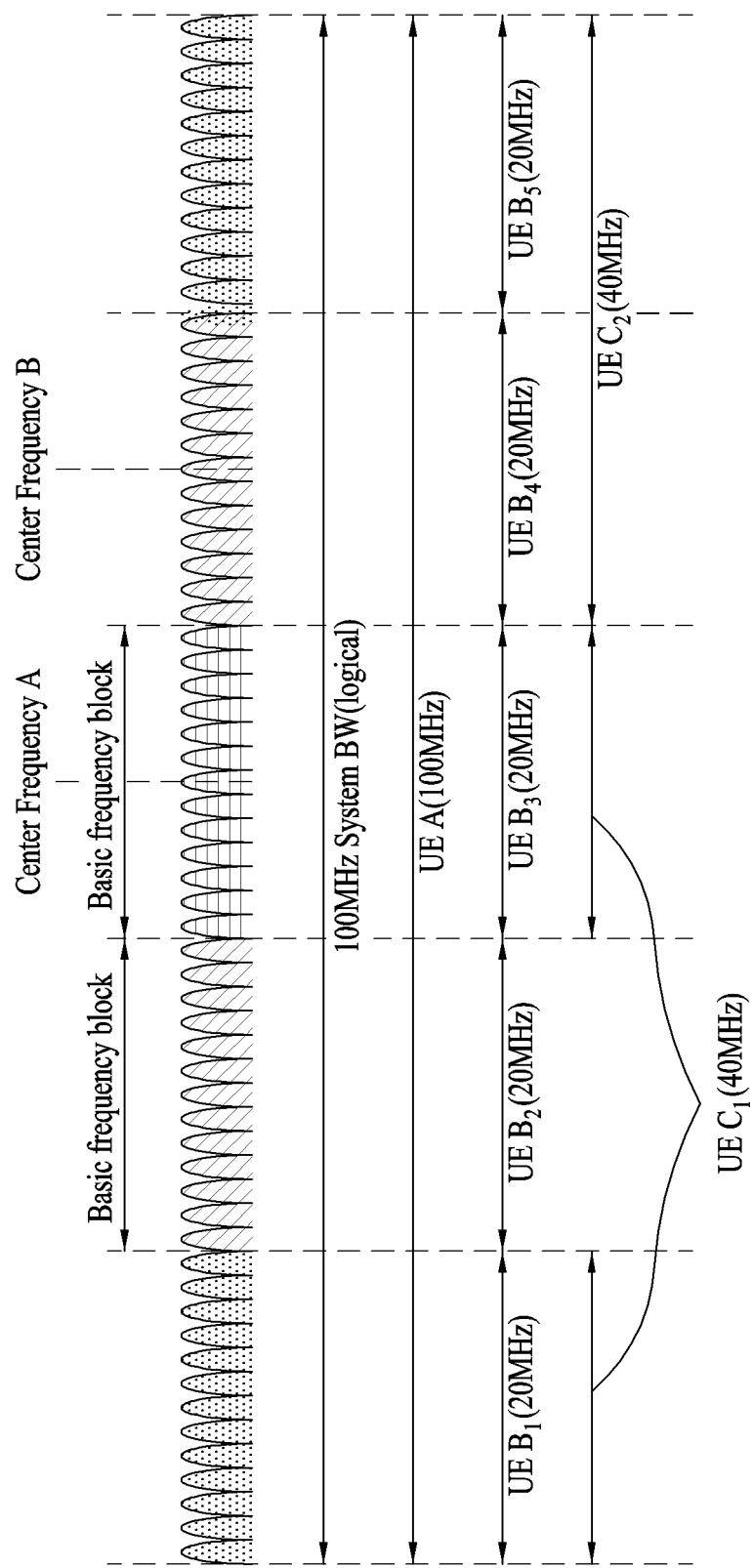
FIG. 8 is a diagram illustrating a carrier aggregation (CA) scheme.

Hereinafter, a carrier aggregation scheme will be described. FIG. 8 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently be used.

Referring to FIG. 8, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 8 illustrates the case in which component carriers have the same bandwidth, the case is purely exemplary, and thus, the component carriers may have different bandwidths. In addition, although FIG. 8 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 8. A downlink component carrier (CC) or a combination of the downlink component carrier and an uplink component carrier (CC) may be referred to as a cell. The relationship between the downlink component carrier and the uplink component carrier may be indicated through system information.

In this case, a method for scheduling a data channel by a control channel may be classified into a linked carrier scheduling method and a cross carrier scheduling method.

In more detail, during link carrier scheduling, a control channel being transmitted via a specific component carrier (CC) as in the legacy LTE system configured to a single CC may control only a data channel to be scheduled through the specific CC. That is, downlink (DL) grant/uplink (UL) grant being transmitted to a PDCCH region of a downlink CC of a specific CC (or a specific cell) can be scheduled in PDSCH/PUSCH of a cell to which the corresponding DL CC belongs. That is, a search space attempting to detect the DL grant/UL grant is present in the PDCCH region of a cell in which PDSCH/PUSCH to be scheduled is located.

Meanwhile, during cross carrier scheduling, a data channel is scheduled. During the data channel scheduling, a control channel being transmitted through a primary CC using a carrier indicator field (CIF) is transmitted through the primary CC or through another CC. In other words, a monitored cell of the cross carrier scheduling is established, and the downlink (DL) grant/uplink (UL) grant being transmitted in the PDCCH region of the monitored cell may schedule PDSCH/PUSCH of the cell to be scheduled in the corresponding cell. That is, the DL grant/UL grant may be present in the PDCCH region in which the search space of a plurality of CCs is monitored. When system information from among the plural cells is transmitted or when initial access is attempted, PCell may be established for transmission of UL control information. PCell may be composed of a DL PCC and a UL PCC corresponding to the DL PCC.

Figure 9:
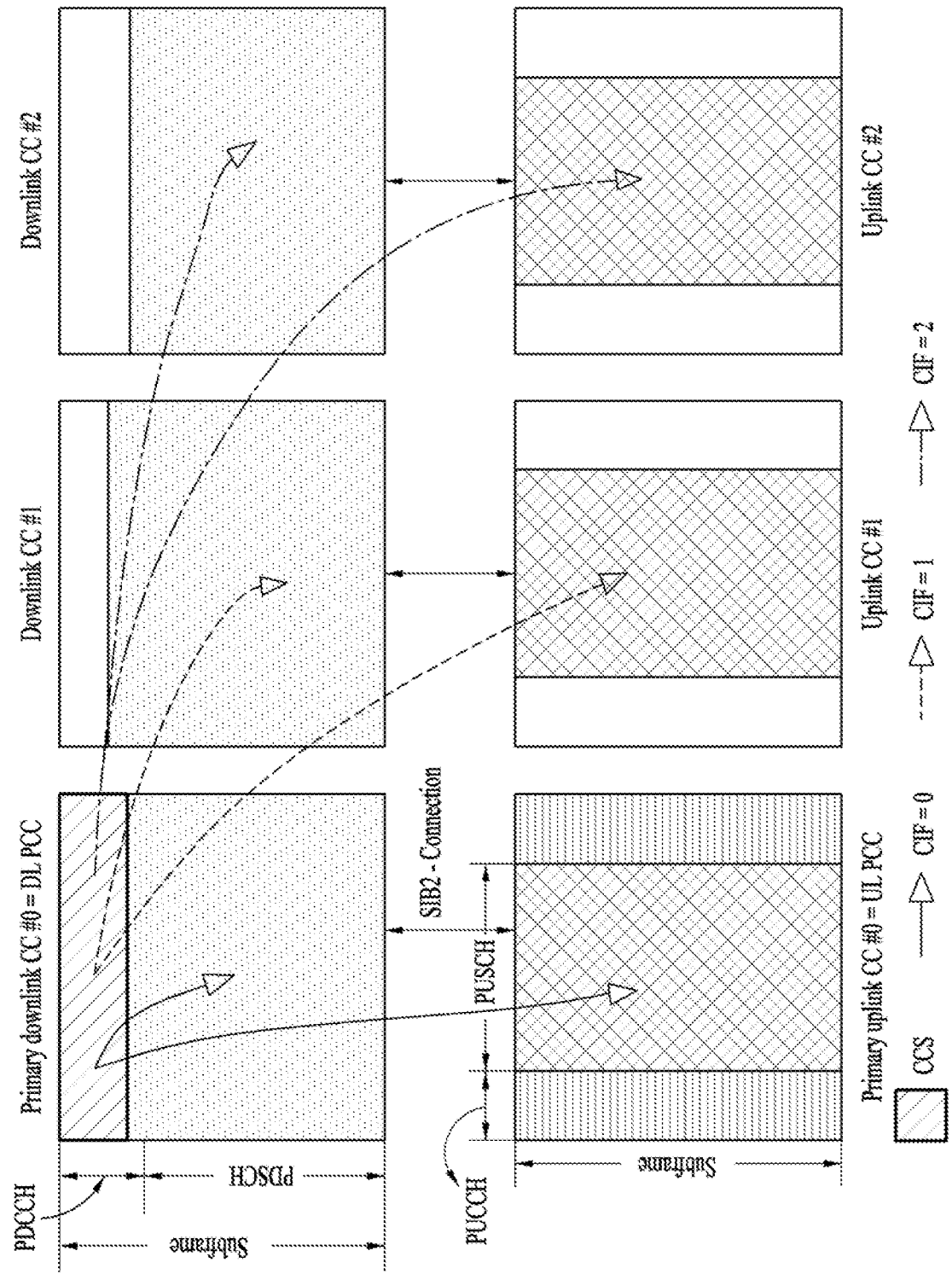
FIG. 9 is a conceptual diagram illustrating carrier aggregation (CA).

FIG. 9 is a conceptual diagram illustrating carrier aggregation (CA). Specifically, the number of allocated cells (or CCs) shown in FIG. 9 is set to 3, and the cross carrier scheduling scheme based on CIF is performed in the cells. Here, it is assumed that DL cell #1 is a downlink primary component carrier (i.e., Primary cell; PCell), and it is assumed that each of Component Carrier #B and Component Carrier #C is used as a secondary cell (SCell) for convenience of description and better understanding of the present invention.

The present invention proposes a method for effectively transmitting scheduling information under the environment in which a UE communicates with the eNB through a plurality of carriers.

Figure 10:
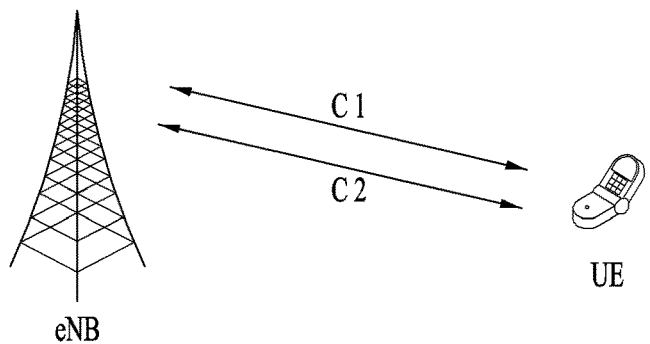
FIG. 10 exemplarily illustrates a situation to which the present invention is applied.

FIG. 10 exemplarily illustrates a situation to which the present invention is applied. Specifically, UE communicates with the eNB using two carriers (C1 and C2). Although the exemplary case in which two carriers are used will be disclosed for convenience of description and better understanding of the present invention, it should be noted that this case can also be applied to the case in which many more carriers are used.

In the present invention, it is assumed that the carrier C1 is set to a primary carrier from the viewpoint of a downlink. In the carrier C1, a downlink resource through which the eNB transmits signals to the UE is defined. If necessary, the carrier C1 may also be used as an uplink resource through which the UE transmits signals to the eNB during a predetermined time. Alternatively, the carrier C1 may be defined to operate only for downlink. For example, the UL operation in the carrier C1 may not be defined in such a manner that the DL resources can be more safely guaranteed.

Since the carrier C1 is a primary carrier from the viewpoint of downlink, a basic control signal for UE, for example, scheduling information or system information for the UE, may be transmitted from the eNB to the UE through the carrier C1. Although the carrier C2 is established as a primary carrier from the viewpoint of uplink, and may also be used for downlink during a predetermined time so as to increase a downlink transfer rate. In this case, the carrier C2 may be established as a subcarrier from the viewpoint of downlink. Since the carrier C2 is a primary carrier from the viewpoint of uplink, a basic control signal (e.g., HARQ-ACK signal regarding data transmitted from the eNB) transmitted from the UE to the eNB is transmitted to the carrier C2. The structures of the carriers C1 and C2 are advantageous in which resource allocation can be smoothly achieved according to a data traffic situation.

For example, C1 and C2 may be respectively a downlink carrier and an uplink carrier in a paired carrier composed of FDD. In this case, C2 is established as a subcarrier from the viewpoint of downlink. If there is a large amount of downlink traffics, the operation for transmitting DL data using the carrier C2 may be momentarily performed.

In another example, C1 and C2 are carriers of a TDD system having different UL/DL subframe configurations. C1 may indicate one case in which the number of DL subframes is relatively higher so that C1 is selected as a primary carrier from the viewpoint of downlink. C2 may indicate the other case in which the number of UL subframes is relatively higher so that C2 is selected as a primary carrier from the viewpoint of uplink. Specifically, C1 may be set to a new UL/DL subframe configuration in which all subframes may be downlink subframes.

In another example, under the situation in which a carrier of the FDD system and a carrier of the TDD system are aggregated, C1 is a downlink carrier of the FDD system, C2 is a carrier of the TDD system, so that C2 and C2 can simultaneously provide the FDD system and the TDD system.

In the case in which the eNB schedules PDSCH or PUSCH for the UE, it is necessary for the eNB to effectively transmit DCI (Downlink Control Information) including the corresponding scheduling information to the UE. A method for transmitting DCI needed for PDSCH scheduling will hereinafter be described.

First Embodiment

First of all, a method for transmitting one PDSCH through C1 and C2 may be used. In accordance with this method, if C1 and C2 are used for downlink, one DCI schedules one PDSCH, and this PDSCH may be transmitted through C1 and C2. That is, assuming that the band of the carrier C2 is an additional band of the carrier C1 and the downlink bandwidth is momentarily increased in the corresponding subframe, PDSCH scheduling may be achieved.

Figure 11:
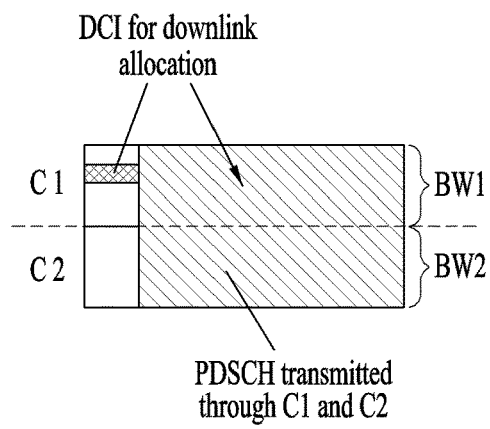
FIG. 11 illustrates a subframe structure through which PDSCH transmission is performed in carriers C1 and C2 according to a first embodiment.

FIG. 11 illustrates a subframe structure through which PDSCH transmission is performed in carriers C1 and C2 according to a first embodiment. In FIG. 11, BW1 is a bandwidth of the carrier C1, BW2 is a bandwidth of the carrier C2, and DCI is transmitted at a downlink primary carrier C1.

Referring to FIG. 11, assuming that the downlink bandwidth of the corresponding subframe is denoted by 'BW1+BW2' corresponding to the sum of C1 and C2, PDSCH scheduling may be carried out. For example, assuming that $N_{C1}$ PRBs are defined in C1, and $N_{C2}$ PRBs are defined in C2, PRB indexes (#0~#($N_{C1}$−1) of the corresponding subframe may be present in C1, and PRB indexes (#$N_{c1}$~#($N_{C1}$+$N_{C2}$−1)) of the corresponding subframe may be present in C2.

Alternatively, in order to prevent such momentary bandwidth extension from being affected by a bandwidth value of another carrier, it is assumed that the bandwidth of the corresponding subframe is denoted by 2*BW1. If BW1 is larger than BW2, some PRBs may not be defined. For example, assuming that $N_{C1}$ PRBs are defined in C1 and $N_{C2}$ PRBs are defined in C2, 2*$N_{C1}$ PRBs are nominally present, however, it may be impossible to use PRB indexes (#($N_{C1}$+$N_{C2}$)~#(2$N_{C1}$−1)). In other words, it is assumed that C2 of the corresponding subframe is a half of the downlink bandwidth having a bandwidth of C1, and it is impossible to use some regions. That is, although some regions are nominally allocated to downlink resources, this means that the actual PDSCH is not mapped.

Although FIG. 11 illustrates that the symbol position for PDSCH start for use in C1 is identical to the symbol position for PDSCH start for use in C2, PDSCH mapping is achieved at an earlier time or a later time according to the eNB indication message. In addition, although FIG. 11 illustrates that PDCCH in which the OFDM symbol located before the PDSCH region is used for DCI transmission, the same symbol as in PDSCH is used, and PDCCH may also be transmitted using an EPDCCH distinguished from the frequency domain.

Meanwhile, the size of DCI for PDSCH scheduling may be affected by the downlink bandwidth, because the number of resource allocation bits is changed according to the downlink bandwidth. Therefore, the UE must attempt to detect a larger-sized DCI in the corresponding subframe, and the eNB may indicate which subframe is associated with such bandwidth extension through higher layer signaling such as RRC signaling or through additional physical layer signaling. Alternatively, in order to simplify a complicated operation for changing the size of DCI detected according to the subframe, it is assumed that bandwidth extension is achieved in all subframes and DCI detection can be attempted in all subframes.

Such DL bandwidth extension may be optionally shown only for a specific UE, such that it may be preferable that DL bandwidth extension is not applied to a common search space in which all UEs attempt to detect a common DCI, and it may also be preferable that DL bandwidth extension is applied only to a UE-specific search space.

Alternatively, DL bandwidth extension is not applied to DCI operating in a fall-back mode as in DCI format 1A, a bandwidth dedicated for the corresponding carrier is assumed and such detection can be attempted Second Embodiment A method for controlling one DCI to schedule two PDSCHs, and respectively transmitting two PDSCHs in C1 and C2 according to the second embodiment may be used.

Figure 12:
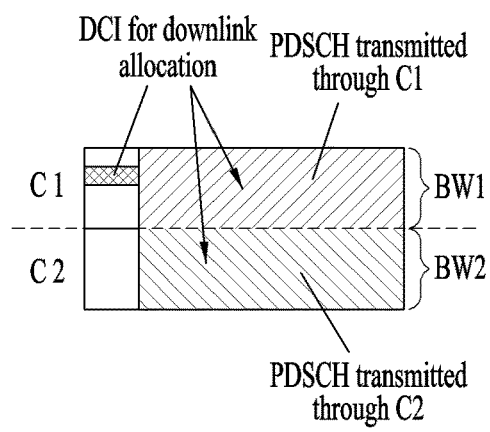
FIG. 12 illustrates a subframe structure through which PDSCH transmission is performed in carriers C1 and C2 according to a second embodiment.

FIG. 12 illustrates a subframe structure through which PDSCH transmission is performed in carriers C1 and C2 according to a second embodiment.

Referring to FIG. 12, only one DCI is transmitted, and a separate PDSCH is defined for each carrier, such that one DCI can schedule two PDSCHs located in different carriers. That is, the same DCI content, for example, MCS (modulation and coding scheme), resource allocation information, RV (redundancy version), etc. may be applied to each of two carriers. Needless to say, data corresponding to PDSCH contents may be different from each other.

In the subframe in which bandwidth extension occurs, assuming that there is a small amount of data to be transmitted to the UE, PDSCH transmission dedicated for a specific carrier is needed. To this end, the UE must recognize whether DCI received from the corresponding subframe is dedicated for the specific carrier or is used in both of two carriers. One of the following operations i) to iii) may be used.

i) It may be designated whether DCI received from each subframe is applied to only one carrier or to two carriers through higher layer signaling (such as RRC) or through separate physical layer signaling. Assuming that DCI received from each subframe is applied only one carrier, it can be designated which one of C1 and C2 is used for PDSCH transmission. Alternatively, it may be assumed that PDSCH transmission is always achieved in the primary carrier C1 only.

ii) It can be designated which carrier is used for the corresponding DCI using a field located in the DCI. For example, one bit field is added so that it may be designated whether the corresponding DCI is applied to C1 only or to both of C1 and C2. In another example, a field of two bits is added so that it may be designated which one of C1 and C2 is associated with application of the corresponding DCI, or it may be designated whether DCI application is applied to both of C1 and C2.

Such addition of a new field may be limited only to a subframe in which PDSCH transmission for C2 is possible. Alternatively, in order to simplify complexity in which the length of DCI decoded according to the subframes is changed, the new field may be added to all subframes as necessary. If a new field is added to all subframes, DCI detection may be carried out in some subframes in which PDSCH transmission for the actual C2 is impossible on the assumption that the corresponding field schedules only C1 transmission. That is, DCI in which the corresponding field is established in another state may be regarded as erroneous detection.

Alternatively, the field present in the legacy DCI may also be used as necessary. For example, if the corresponding field is allocated to a specific state using the HARQ process ID field from among DL allocation information, the corresponding DCI may be applied to both of C1 and C2.

iii) Finally, the carrier to be used may be determined according to the number of PRBs allocated by DCI. For example, if a predetermined number of PRBs or higher are allocated, this means that the PRBs attempt to process a large amount of data, so that the corresponding DCI may be applied to both of C1 and C2. In contrast, a predetermined number of PRBs or less are allocated, this means that the PRBs attempt to process a small amount of data, so that PDSCH transmission is dedicated for C1 only.

When PDSCH scheduling is performed according to this scheme, if C1 and C2 have different bandwidths, appropriate operations are needed. For example, assuming that $N_{C1}$ PRBs are defined in C1 and $N_{c2}$ PRBs are defined in C2, and $N_{c1} > N_{c2}$ is given, when DCI is allocated to PDSCH in which PRBs (#$N_{c2}$ #($N_{C1}$−1)) are transmitted to C2, this means that the abov operation is regarded as the above nominal DL allocation and the actual PDSCH is not mapped.

Alternatively, if C1 and C2 have different bandwidths, when one DCI simultaneously schedules PDSCH of C1 and PDSCH of C2, the eNB may prevent resource allocation exceeding the bandwidth of C2 in advance. That is, the UE may assume that such scheduling is not carried out, such scheduling may be regarded as erroneous DCI detection.

In the case of using the above scheme, PDSCH is separately transmitted in each of C1 and C2, and the success or failure of decoding may also be independently determined in each of C1 and C2. Therefore, a method for properly reporting HARQ-ACK for two PDSCHs to the eNB is needed. For example, HARQ-ACK for two PDSCHs is bundled. That is, a logical AND of HARQ-ACK values of individual codewords is regarded as the final HARQ-ACK, and this final HARQ-ACK may be reported to the eNB.

Third Embodiment

In accordance with the third embodiment, a method for transmitting two DCIs in the carrier C1 may be used. In more detail, the first DCI of the two DCIs is used for PDSCH scheduling in C1, and the second DCI is used for PDSCH scheduling in C2. in accordance with the above-mentioned method of the third embodiment, different PDSCHs are transmitted in C1 and C2, and DCIs needed for C1 and C2 scheduling are transmitted separately from each other.

Figure 13:
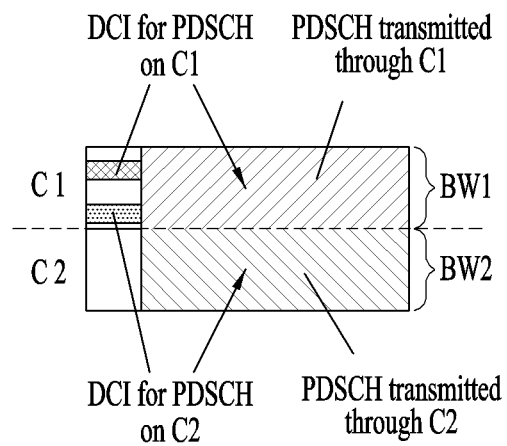
FIG. 13 illustrates a subframe structure through which PDSCH transmission is performed in carriers C1 and C2 according to a third embodiment.

FIG. 13 illustrates a subframe structure through which PDSCH transmission is performed in carriers C1 and C2 according to a third embodiment.

Referring to FIG. 13, DCI is transmitted in C1 acting as the DL primary carrier, such that there occurs cross carrier scheduling in which DCI is scheduled in C1 and PDSCH is scheduled in C2.

If PDSCH for C1 and PDSCH for C2 are distinguished from each other according to different DCIs, there is a need for each DCI to include a field (i.e., carrier indication field (CIF)) indicating which carrier is associated with the scheduling information. This CIF is needed for a subframe in which C2 is used for downlink or a subframe to be used for downlink. However, there is no need to establish the CIF in the subframe which is not scheduled for downlink or does not have a possibility that the sufframe is used for downlink. For example, the above-mentioned subframe may be a subframe in which C2 is configured as an uplink subframe in all UL/DL subframe configurations of the TDD system, or may be a subframe in which PDSCH transmission does not occur according to the designation result obtained by separate higher layer signaling or separate physical layer signaling.

Therefore, such CIF may appear only in the subframe in which C2 is used for downlink, or may appear only in the subframe in which there is a possibility that C2 will be used for downlink. In the remaining subframes, DCI can be detected on the assumption that there is no CIF. Alternatively, in order to simplify complexity in which the length of DCI is changed according to subframes, DCI can be detected on the assumption that CIF is present in all subframes.

Assuming that DCI for PDSCH is transmitted in C1 and C2, DCI blind decoding to be performed in C1 by UE needs to be defined. In this case, one of the following methods a) to d) may be used.

a) DCI for PDSCH for C2 is separately blind-decoded. The increasing number of blind decoding (BD) times is needed for only the subframe in which C2 is used only for downlink, or is needed for only the subframe in which C2 will be used for downlink. That is, in the subframe in which C2 is not used for downlink, or in the subframe in which there is no possibility that C2 is used for downlink, the number of BD times is not increased, the number of calculation times of the subframe in which C2 is not used for downlink is reduced, such that UE poser consumption can be reduced.

b) DCI for PDSCH of C2 is blind-decoded separately. In the subframe in which C2 is not used for downlink, or in the subframe in which there is no possibility that C2 is not used for downlink, the number of BD times for C2 may be used to increase the number of DCI candidates, such that the number of cases in which all CI candidates are occupied by other DCIs can be reduced.

c) Blind decoding (BD) of DCI for PDSCH in C2 may use BD capability for PDSCH in C1. That is, in the subframe in which C2 is used for downlink, or in the subframe in which there is a possibility that C2 will be used for downlink, the number of DCI candidates for PDSCH in C1 is reduced, so that a total number of BD times in only one subframe can be maintained at a constant number.

d) The DCI length for PDSCH in C2 is adjusted to be identical to the DCI length for PDSCH in C1, such that the number of additional BD times is not increased. For example, if the DCI length for PDSCH in C2 is different from the DCI length for PDSCH in C1, a predetermined number of bits is added so that the same length can be achieved. In another example, even when DCI for PDSCH is generated in C2, a transmission mode, a bandwidth, etc. may be identical to those of PDSCH of C1, such that the same DCI length may also be maintained.

Fourth Embodiment

Finally, a method for scheduling PDSCH using a separate DCI in each carrier according to the fourth embodiment may be used.

Figure 14:
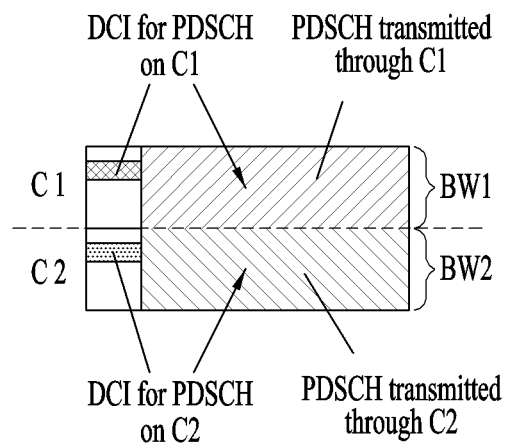
FIG. 14 illustrates a subframe structure through which PDSCH transmission is performed in carriers C1 and C2 according to a fourth embodiment.

FIG. 14 illustrates a subframe structure through which PDSCH transmission is performed in carriers C1 and C2 according to a fourth embodiment.

Referring to FIG. 14, differently from DCI transmission and PDSCH scheduling for use in C1, separate DCI is transmitted in C2, and this DCI may schedule a PDSCH in C2.

In this case, assuming that the UE decides the subframe in which C2 is not used for downlink or decides the other subframe in which there is no possibility that C2 will not be used for downlink, this means that DCI transmission in C2 is impossible, such that the corresponding blind decoding (BD) may be omitted.

Meanwhile, the eNB may schedule a PUSCH transmitted from the UE using some resources of the carrier C1, and may transmit DCI for the PUSCH. Assuming that UL transmission in C1 is impossible in a specific subframe, the uplink grant for C1 is not transmitted in a subframe that interacts with the corresponding subframe through the UL grant, such that only the UL grant for C2 can be transmitted in the subframe interacting through the UL grant. Therefore, CIF for the UL grant can be omitted in the subframe interacting through the corresponding UL grant, such that unnecessary overhead in DCI can be reduced.

In this case, the interaction in which a specific subframe interacts with another subframe through the UL grant may indicate that PUSCH transmission is achieved in the specific subframe according to the UL grant received by the interacting subframe. That is, when PUSCH is transmitted at the subframe #n+k according to the UL grant transmitted at the subframe #n, the subframe interacting with the subframe #n+k through the UL grant may be denoted by Subframe #n. Assuming that several subframes are interacting with each other through the same one UL grant, if PUSCH transmission in C1 is possible even in only one subframe of the plurality of subframes, the interaction in which the presence of CIF is possible must be achieved.

Assuming that additional blind decoding (BD) for downlink allocation for C2 is performed according to the third embodiment, UE implementation may have difficulty owing to BD addition for the UL grant for C2. In order to address this issue, downlink allocation in C2 is adjusted to be identical to the length of UL grant in C2, such that separate downlink allocation and separate UL grant may not be additionally blind-decoded in C2.

In this case, although there is no need to discriminate each carrier from the viewpoint of UL grant because PUSCH transmission is not present in the carrier C1, the CIF for discriminating each carrier in downlink allocation is present, such that the CIF for the UL grant in C2 may be added to adjust the DCI length. However, the added CIF is meaningless from the viewpoint of the UL grant, such that the added CIF may be in a predetermined specific state in the same manner as in the case in which all bits are set to zero (0).

Figure 15:
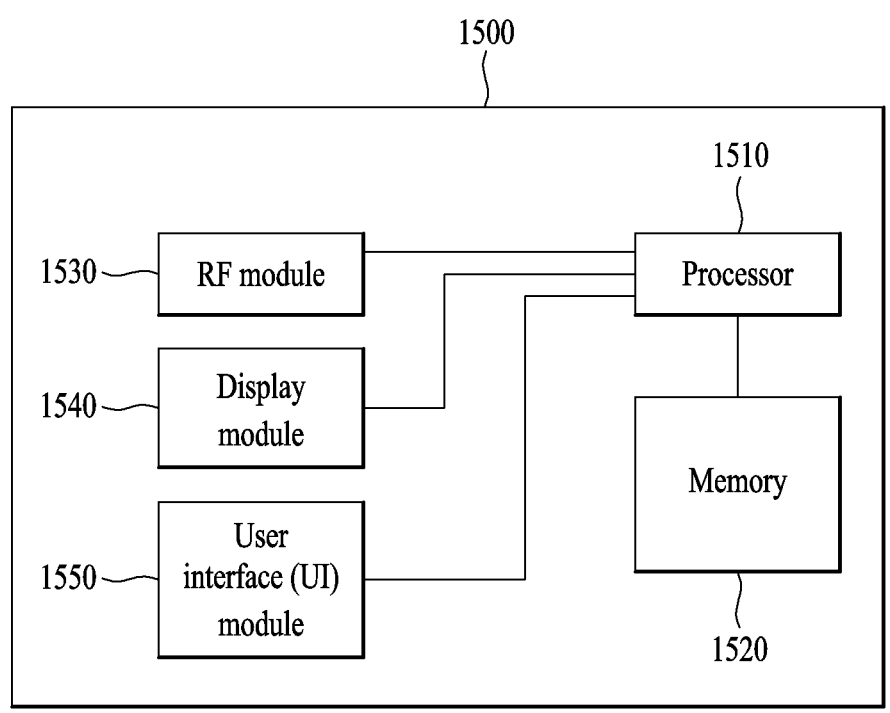
FIG. 15 is a block diagram of a communication apparatus according to an embodiment of the present invention.

FIG. 15 is a block diagram of a structure of a communication device 1500 according to an embodiment of the present invention.

Referring to FIG. 15, the communication device 1500 includes a processor 1510, a memory 1520, an RF module 1530, a display module 1540, and a user interface module 1550.

The communication device 1500 is illustrated for convenience of description and some modules may not be omitted. The communication device 1500 may further include necessary modules. In addition, some modules of the communication device 1500 may be subdivided. The processor 1510 is configured to perform operations according to the embodiment of the present invention that is exemplified with reference to the diagrams. In detail, a detailed operation of the processor 1510 would be understood with reference to FIGS. 1 to 14.

The memory 1520 is connected to the processor 1510 and stores an operating system, an application, a program code, data, etc. The RF module 1530 is connected to the processor 1510 and converts a baseband signal into a radio signal or converts a radio signal into a baseband signal. To this end, the RF module 1530 performs analog conversion, amplification, filtering, and frequency up-conversion, or inverse procedures thereof. The display module 1540 is connected to the processor 1510 and displays various pieces of information. The display module 1540 may use, but is not limited to, well-known elements such as a liquid crystal display (LCD), a light emitting diode (LED), and an organic light emitting diode (OLED). The user interface module 1550 may be connected to the processor 1510 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

As is apparent from the above description, although the method and apparatus for transmitting a discovery signal for D2D direct communication in a wireless communication system have been disclosed on the basis of application to 3GPP LTE, the inventive concept of the present invention is applicable not only to 3GPP LTE, but also to other wireless communication systems.

What is claimed is:

1. A method for receiving a signal from a base station (BS) through a first carrier and a second carrier in a wireless communication system, the method performed by a user equipment (UE) and comprising:
receiving information indicating whether a subframe on the second carrier is used for downlink (DL) transmission;
receiving DL control information through the first carrier on the subframe by performing blind decoding with respect to one or more DL control information candidates based on the received information; and
receiving one or more DL data channels on the subframe through at least the first carrier or the second carrier based on the DL control information,
wherein the UE performs blind decoding with respect to N1 first DL control information candidates for the one or more DL data channels for transmission on the subframe in the first carrier and performs blind decoding with respect to N2 second DL control information candidates for the one or more DL data channels for transmission on the subframe in the second carrier in order to receive the DL control information when the received information indicates that the subframe of the second carrier is used for DL transmission,
wherein the UE performs blind decoding with respect to N1+N2 first DL control information candidates for the one or more DL data channels for transmission on the subframe in the first carrier in order to receive the DL control information when the received information indicates that the subframe of the second carrier is not used for DL transmission, and
wherein N1 and N2 are natural numbers.

2. The method according to claim 1, wherein:
the first carrier is a DL frequency band of a frequency division duplex (FDD) mode; and
the second carrier is a frequency band of a time division duplex (TDD) mode.

3. The method according to claim 1, wherein the one or more DL control channels are transmitted through UE-specific search space.

4. The method according to claim 1, further comprising receiving a first DL data channel on the subframe through the first carrier and receiving a second downlink data channel on the subframe through the second carrier when the received information indicates that the subframe of the second carrier is used for DL transmission.

5. The method according to claim 1, further comprising receiving a first DL data channel on the subframe through the first carrier when the received information indicates that the subframe of the second carrier is used for DL transmission.

6. The method according to claim 1, wherein the information is received through higher layer signaling or physical layer signaling.

7. The method according to claim 1, wherein the one or more DL data channels correspond to one or more physical downlink shared channels (PDSCHs).

8. A user equipment (UE) receiving a signal from a base station (BS) through a first carrier and a second carrier in a wireless communication system, the UE comprising:
receiver configured to receive information;
processor connected to the receiver and configured to:
control the receiver to receive information indicating whether a subframe on the second carrier is used for downlink (DL) transmission;
control the receiver to receive DL control information through the first carrier on the subframe by performing blind decoding with respect to one or more DL control information candidates based on the received information; and
control the receiver to receive one or more DL data channels based on the DL control information on the subframe through at least the first carrier or the second carrier,
wherein the processor is further configured to perform blind decoding with respect to N1 first DL control information candidates for the one or more DL data channels for transmission on the subframe in the first carrier and to perform blind decoding with respect to N2 second DL control information candidates for the one or more DL data channels for transmission on the subframe in the second carrier in order to receive the DL control information when the received information indicates that the subframe of the second carrier is used for DL transmission,
wherein the processor is further configured to perform blind decoding with respect to N1+N2 first DL control information candidates for the one or more DL data channels for transmission on the subframe in the first carrier in order to receive the DL control information when the received information indicates that the subframe of the second carrier is not used for DL transmission, and
wherein N1 and N2 are natural numbers.

9. The UE according to claim 8, wherein:
the first carrier is a DL frequency band of a frequency division duplex (FDD) mode; and
the second carrier is a frequency band of a time division duplex (TDD) mode.

10. The UE according to claim 8, wherein the one or more DL data channels are transmitted through UE-specific search space.

11. The UE according to claim 8, wherein the processor is further configured to control the receiver to receive a first DL data channel on the subframe through the first carrier and to receive a second DL data channel on the subframe through the second carrier when the received information indicates that the subframe of the second carrier is used for DL transmission.

12. The UE according to claim 8, wherein the processor is further configured to control the receiver to receive a first DL data channel on the subframe through the first carrier when the received information indicates that the subframe of the second carrier is used for DL transmission.

13. The UE according to claim 8, wherein the information is received through higher layer signaling or physical layer signaling.

14. The UE according to claim 8, wherein the one or more DL data channels correspond to one or more physical downlink shared channels (PDSCHs).

* * * * *